ns Patent [19] [11] 4,349,603
Kameyama et al. [45] Sep. 14, 1982

[54] LAMINATED MULTILAYER STRUCTURE

[75] Inventors: Masao Kameyama, Iwakuni; Teiichi Shiomi, Ohtake, both of Japan

[73] Assignee: Mitsui Petrochemical Industries, Ltd., Tokyo, Japan

[21] Appl. No.: 266,470

[22] Filed: May 22, 1981

[30] Foreign Application Priority Data

May 26, 1980 [JP] Japan .................................. 55-68874
Feb. 19, 1981 [JP] Japan .................................. 56-22198

[51] Int. Cl.³ ............................................. B32B 27/32
[52] U.S. Cl. ................................. 428/334; 428/335; 428/336; 428/339; 428/447; 428/451
[58] Field of Search ............................... 428/334–336, 428/339, 451, 447

[56] References Cited

U.S. PATENT DOCUMENTS 3,650,808  3/1972  Gagnon ............................. 428/412
3,720,699  3/1973  Stoddard ....................... 260/448.8 R

FOREIGN PATENT DOCUMENTS 2752617  1/1978  Fed. Rep. of Germany .
54-61274  5/1979  Japan .................................. 428/447
56-11248  2/1981  Japan .................................. 428/451

Primary Examiner—Ellis P. Robinson
Attorney, Agent, or Firm—Sherman & Shalloway

[57] ABSTRACT

A laminated multilayer structure comprising
(1) a thermoplastic olefin resin layer (A) in the form of a shaped article,
(2) a primer layer (B) liquid-coated on and contacted with at least one surface of the layer (A) and composed of ($b_1$) 20 to 100% by weight based on the weight of the layer (B) of a graft-modified synthetic olefinic rubber or graft-modified 4-methyl-1-pentene resin obtained by grafting an organic silane compound having the following formula

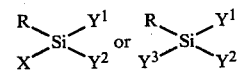

wherein R represents a monovalent olefinically unsaturated hydrocarbon radical having up to 20 carbon atoms or a monovalent olefinically unsaturated hydrocarbonoxy radical having up to 11 carbon atoms, X represents a monovalent hydrocarbon radical selected from the class consisting of alkyl groups having 1 to 20 carbon atoms and aryl groups having 6 to 8 carbon atoms, and $Y^1$, $Y^2$ and $Y^3$ are identical or different and each represents a functional member selected from the class consisting of alkoxy groups having 1 to 6 carbon atoms, alkylcarbonyl groups having 1 to 10 carbon atoms, oxime groups having 3 to 15 carbon atoms and substituted amino groups having a substituent selected from lower alkyl groups and a phenyl group, and ($b_2$) 0 to 80% by weight based on the weight of the layer (B) of an ultraviolet stabilizer, and
(3) a cured layer (C) liquid-coated on and contacted with the layer (B) and derived from an uncured crosslinkable Si-containing compound selected from the group consisting of organo-alkoxysilanes, organo-acyloxysilanes and organo-polysiloxanes.

8 Claims, No Drawings

LAMINATED MULTILAYER STRUCTURE

This invention relates to a laminated multilayer structure having improved properties such as surface hardness, surface luster, abrasion resistance, transparency and weatherability.

More specifically, it pertains to a laminated multilayer structure comprising (1) a thermoplastic olefin resin layer (A) in the form of a shaped article, (2) a primer layer (B) liquid-coated on and contacted with at least one surface of the layer (A) and composed of ($b_1$) 20 to 100% by weight based on the weight of the layer (B) of a graft-modified synthetic olefinic rubber or graft-modified 4-methyl-1-pentene resin obtained by grafting an organic silane compound having the following formula

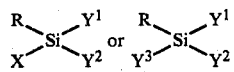

wherein R represents a monovalent olefinically unsaturated hydrocarbon radical having up to 20 carbon atoms or a monovalent olefinically unsaturated hydrocarbonoxy radical having up to 11 carbon atoms, X represents a monovalent hydrocarbon radical selected from the class consisting of alkyl groups having 1 to 20 carbon atoms and aryl groups having 6 to 8 carbon atoms, and $Y^1$, $Y^2$ and $Y^3$ are identical or different and each represents a functional member selected from the class consisting of alkoxy groups having 1 to 6 carbon atoms, alkylcarbonyl groups having 1 to 10 carbon atoms, oxime groups having 3 to 15 carbon atoms and substituted amino groups having a substituent selected from lower alkyl groups and a phenyl group, and ($b_2$) 0 to 80% by weight based on the weight of the layer (B) of an ultraviolet stabilizer, and (3) a cured layer (C) liquid-coated on and contacted with the layer (B) and derived from an uncured crosslinkable Si-containing compound selected from the group consisting of organo-alkoxysilanes, organo-acyloxysilanes and organopolysiloxanes.

Generally, shaped articles of thermoplastic resin, whether transparent or non-transparent, have lower surface hardness than metals, glasses, etc. and are liable to be marred by scratch or abrasion. In particular, the poor scratch resistance of poly(methyl methacrylate), polycarbonate, polystyrene, and thermoplastic olefinic resins such as a polymer or copolymer of 4-methyl-1-pentene and a polymer or copolymer of propylene is a serious defect detrimental to practical application. In order to remedy such a defect, it was proposed to coat a plastic base layer with an organoalkoxysilane (e.g., U.S. Pat. Nos. 3,720,699 and 3,650,808) and other Si-containing organic compounds (e.g., German OLS No. 2752617 corresponding to French Pat. No. 2372204 and Japanese Laid-Open Patent Publication No. 81533/1978) in the liquid state. The above-cited German Laid-Open patent publication No. 2752617 states that the aforesaid layer liquid-coated on and contacted with the plastic base layer is easily peelable, and in order to remove this defect, proposes to provide a primer layer in contact with the base layer between the liquid-coated layer and the plastic base layer. Thus, this German patent document discloses a primer composition for forming the above layer, which is composed of (1) 0 to 40% by weight of a silane having the following formula

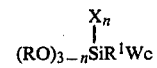

wherein R represents a hydrogen atom or an alkyl group, X represents a hydrogen atom, an alkyl group or an aryl group, $R^1$ represents an alkenyl group, a phenoxy group or an alkylene group having 2 to 8 carbon atoms, W represents a carboxylic acid group, an epoxy group, a nitrogen-functional alkyl group, or a nitrogen-functional alkyl group having a carbonyl or alkenyl functional group further, n is a number in the range of 0 to 2, and c is 0 or 1, (2) 1 to 40% by weight of a reaction product of the aforesaid silane and a cyclic anhydride or dianhydride, and (3) 20 to 99% by weight of an aliphatic solvent or a saturated aliphatic solvent having 1 to 8 carbon atoms.

This patent document mentions metals, glass, ceramics, thermoplastics such as polycarbonate, polyphenylene oxide, polystyrene and polyvinyl chloride as a base on which to coat the above primer composition, but fails to disclose thermoplastic olefin resins such as polyolefins.

The present inventors found that the primer composition for liquid coating as suggested in the above German patent document is useful for thermoplastic resin bases containing a polar group in the molecule such as polycarbonate and polymethyl methacrylate, but even when applied to a base layer of a thermoplastic resin having no polar group in the molecule, such as polyolefins, the resulting primer layer easily peels off, and serves for no practical purpose.

The present inventors thus made investigations in order to improve the surface hardness, surface luster and abrasion resistance of a thermoplastic olefin resin base layer without adversely affecting the transparency of a thermoplastic olefin resin such as polyolefins, especially olefin resins having excellent transparency, for example a polymer or copolymer of an olefin selected from propylene and 4-methyl-1-pentene.

These investigations have led to the discovery that by providing a primer layer (B) of a graft-modified synthetic olefinic rubber or graft-modified 4-methyl-1-pentene resin composed of a synthetic olefinic rubber or 4-methyl-1-pentene resin obtained by grafting an organic silane compound between a thermoplastic olefin resin layer (A) and a cured layer (C) derived from an uncured crosslinkable Si-containing compound, the defect of peeling between the thermoplastic olefin resin layer (A) and the cured layer (C) can be remedied, and the surface properties of the thermoplastic olefin resin base layer can be improved.

It has also been found that by incorporating up to 80% by weight, preferably up to 70% by weight, based on the weight of the primer layer, of an ultraviolet stabilizer (or absorber) in a primer layer composed of the aforesaid graft-modified synthetic olefinic rubber or a graft-modified 4-methyl-1-pentene resin, the excellent adhesion between the thermoplastic olefin resin layer (A) and the cured layer (C) is not likely to be reduced, even under severe conditions in long-term outdoor exposure, and better improving effects can be achieved.

It is an object of this invention therefore to provide a laminated multilayer structure having improved properties, said structure being composed of a thermoplastic olefin resin layer (A) in the form of a shaped article, a primer layer (B) liquid-coated on and contacted with the surface of the layer (A) and a cured layer (C) liquid-coated on and contacted with the layer (B).

The above and other objects of this invention will become apparent from the following description.

Examples of the olefin resin used to form the layer (A) in the form of a shaped article, preferably a melt-shaped article, are polymers or copolymers of olefins having 2 to 6 carbon atoms. Examples of the $C_2$–$C_6$ olefins include ethylene, propylene, 1-butene, 1-hexene, 3-methyl-1-pentene, and 4-methyl-1-pentene. The copolymers may be copolymers of $C_2$–$C_6$ olefins with different olefins $C_2$–$C_6$ olefins, and or with at least one other olefins having up to 30 carbon atoms.

Among the $C_2$–$C_6$ olefin polymers or copolymers, a polymer or copolymer of an olefin selected from propylene and 4-methyl-1-pentene which has good transparency is preferred. Specific examples of the olefin resin of the layer (A) include polypropylene, a copolymer of propylene with up to about 10 mole % of at least one comonomer selected from the group consisting of ethylene and $C_4$ to $C_6$ α-olefins (e.g., ethylene, 1-butene, or 1-hexene), poly(4-methyl-1-pentene), a copolymer of 4-methyl-1-pentene with up to 20 mole % of at least one comonomer selected from the group consisting of $C_2$ to $C_{30}$ olefins, preferably $C_6$ to $C_{18}$ olefins other than 4-methyl-1-pentene, such as 1-hexene, 3-methyl-1-pentene, 1-octene, 1-decene, 1-dodecene, 1-hexadecene, 1-tetradecene, 1-octadecene, 1-eicocene, 1-dococene, 1-tetracocene, 1-hexacocene, 1-octacocene, and 1-triacontene.

The primer layer (B) in contact with the layer (A) in the laminated multilayer structure of the invention is composed of the following components ($b_1$) and ($b_2$).

($b_1$) 20 to 100%, preferably 30 to 96%, more preferably 40 to 70%, by weight based on the weight of the layer (B) of a graft-modified synthetic olefinic rubber or graft-modified 4-methyl-1-pentene resin composed of a synthetic olefinic rubber or 4-methyl-1-pentene resin obtained by grafting an organic silane compound having the following formula

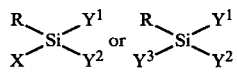

wherein R represent a monovalent olefinically unsaturated hydrocarbon radical having up to 20 carbon atoms or a monovalent olefinically unsaturated hydrocarbonoxy radical having up to 11 carbon atoms, X represents a monovalent hydrocarbon radical selected from the class consisting of alkyl groups having 1 to 20 carbon atoms and aryl groups having 6 to 8 carbon atoms, and $Y^1$, $Y^2$ and $Y^3$ are identical or different and each represents a functional member selected from the class consisting of alkoxy groups having 1 to 6 carbon atoms, alkylcarbonyl groups having 1 to 10 carbon atoms, oxime groups having 3 to 15 carbon atoms and substituted amino groups having a substituent selected from lower alkyl groups and a phenyl group, and ($b_2$) 0 to 80%, preferably 4 to 70%, more preferably 30 to 60%, by weight based on the weight of the layer (B) of an ultraviolet stabilizer.

In order to form a solution or emulsion of the synthetic olefinic rubber for liquid coating, the synthetic olefinic rubber after being graft-modified is preferably soluble or partly soluble in organic solvents. For this reason, the synthetic olefinic rubber is preferably an amorphous to relatively low crystalline synthetic olefinic rubber having a degree of crystallization, determined by an X-ray diffraction method, of from 0 to about 50%, preferably 0 to about 30%. Specific examples of such a synthetic olefinic rubber are ethylene/α-olefin ($C_3$–$C_8$) random copolymers, ethylene/α-olefin ($C_3$–$C_8$)/diene random copolymers, propylene/α-olefin ($C_4$–$C_8$) random copolymers, propylene/α-olefin ($C_4$–$C_8$)/diene random copolymers, halogenated polyethylene, ethylene/vinyl acetate copolymer, 4-methyl-1-pentene/α-olefin ($C_6$–$C_{18}$) random copolymers, halogenated poly(4-methyl-1-pentene), and halogenated 4-methyl-1-pentene/α-olefin ($C_6$–$C_{18}$) random copolymers, which have the advantage of further increasing the bonding affinity between the layer (A) and the layer (C). Especially preferred olefinic rubbers are an ethylene/$C_3$–$C_8$ α-olefin random copolymer rubber (ethylene unit content 50–95 mole%; density 0.86–0.90 g/cm³; melt index 0.2–1000 g/10 min.), an ethylene/$C_3$–$C_8$ α-olefin/diene random copolymer rubber (ethylene unit content 50–95 mole%; iodine value 5–40; density 0.86–0.90 g/cm³; melt index 0.2–1000 g/10 min.), and a propylene/butene-1 random copolymer rubber (propylene unit content 50–90 mole%; melt index 1–20 g/10 min.).

Examples of the 4-methyl-1-pentene resin include not only poly(4-methyl-1-pentene) but also copolymers of 4-methyl-1-pentene with $C_6$–$C_{18}$ olefins, such as 4-methyl-1-pentene/1-hexene copolymer, 4-methyl-1-pentene/1-octene copolymer, 4-methyl-1-pentene/decene copolymer, 4-methyl-1-pentene/1-undecene copolymer, 4-methyl-1-pentene/1-tetradecene copolymer, 4-methyl-1-pentene/1-hexadecene/1-octadecene terpolymer.

In the formulae representing the organic silane compound, R may be a monovalent olefinically unsaturated hydrocarbon radical having up to 20 carbon atoms or a monovalent olefinically unsaturated hydrocarbonoxy radical having up to 11 carbon atoms, such as vinyl, allyl, butenyl, cyclohexenyl, cyclopentadienyl, cyclohexadienyl, $CH_2=C(CH_3)COO(CH_2)_3—$, $CH_2=C(CH_3)COO(CH_2)_2O(CH_2)_3—$, and $CH_2=C(CH_3)COOCH_2OCH_2CH(OH)CH_2O—(CH_2)_3—$.

In the above formulae, X is an alkyl group having 1 to 20 carbon atoms such as methyl, ethyl, propyl, butyl, amyl, octyl, decyl, tetradecyl, and octadecyl, and an aryl group having 6 to 8 carbon atoms such as phenyl, benzyl and tolyl.

Examples of $Y^1$, $Y^2$ and $Y^3$ in the above formulae are alkoxy groups having 1 to 6 carbon atoms such as methoxy, ethoxy, propoxy, butoxy, pentiloxy and hexyloxy, alkylcarbonyl groups having 1 to 10 carbon atoms such as formyloxy, acetoxy and propinoxy, oxime groups having 3 to 15 carbon atoms such as $—ON=C(CH_3)_2$, $—ON=C(CH_3)(C_2H_5)$, $—ON=C(C_6H_5)_2$, $—ON=C(CH_3)(C_6H_5)$, $—ON=C(C_2H_5)(C_6H_5)$ and $—ON=C(CH_3)(C_7H_8)$ and substituted amino groups having a substituent selected from lower alkyl groups and a phenyl group, such as —NH(CH₃), —NH(C₂H₅), —NH(C₃H₇), —NH(C₆H₅) and —NH(C₇H₈).

Compounds having the following formula

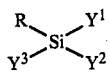

wherein R represents a vinyl or allyl group, and $Y^1$, $Y^2$ and $Y^3$ are identical or different and each represents an alkoxy group having 1 to 6 carbon atoms, are preferred as the organic silane compound.

Specific examples of the organic silane compounds mentioned above include vinylmethyldimethoxysilane, vinylethyldiethoxysilane, vinylphenyldimethoxysilane, vinylmethyldiacetoxysilane, vinylmethyldiacetoximesilane, vinyltrimethoxysilane, vinyltriethoxysilane, vinyltris(methoxyethoxy)silane, vinyltriacetoxysilane, allyltrimethoxysilane, allyltributoxysilane, allyl-tris(methoxy ethoxy)silane, 1-octenyl-triisopropoxysilane, γ-methacryloxypropyltrimethoxysilane, and mixtures of two or more of these.

The graft-modified synthetic olefinic rubber or the graft-modified 4-methyl-1-pentene resin used to form the layer (B) in the present invention can be easily produced by grafting at least one of the organic silane compounds represented by the above formulae to a synthetic olefinic rubber or 4-methyl-1-pentene resin.

For example, the rubber or resin is heat-melted in the presence or absence of a solvent, and with sufficiently strong stirring, the organic silane compound is consecutively added and grafted onto the rubber or resin under heating conditions. The reaction temperature is, for example about 100° to about 300° C., more preferably about 140° to about 200° C. The reaction time is about 1 to about 20 hours. The rate of consecutive addition can be properly selected, but, for example, it is about 0.1 mmole to about 10 mmoles/min./kg of rubber or resin, preferably about 0.5 mmole to about 5 mmoles/min./kg of rubber or resin.

The reaction operation can be performed by any of a batch method, a continuous method, etc., but the batch method is preferred. The reaction is carried out preferably in the presence of a radical initiator, and in a preferred embodiment, the reaction is carried out while adding the initiator gradually to the reaction system.

By performing the grafting reaction by the above-exemplified techniques, the organic silane compound can be uniformly grafted to the rubber or resin at a high grafting efficiency (the ratio of the amount of the monomer grafted to the amount of the monomer charged), and the formation of a homopolymer of the organic silane compound is greatly inhibited. Accordingly, after the reaction, it is sufficient only to remove the unreacted grafting monomer, the radical initiator, and volatile components resulting from the decomposition of the radical initiator under vacuum. It is possible therefore to omit the purifying process involving dissolution, precipitation, extraction, etc. which add to the cost of production.

The amounts of the organic silane compound and the radical initiator added to the rubber or resin can be properly changed over a wide range depending upon the type of the rubber or resin, the reaction temperature, the desired amount of the monomer grafted, etc. The preferred amount of the organic silane compound is, for example, about 0.5 to about 400 parts by weight, especially about 10 to about 300 parts by weight, per 100 parts by weight of the rubber or resin, and the preferred amount of the radical initiator is 0.01 to 200 parts by weight, especially about 0.03 to about 100 parts by weight, per 100 parts by weight of the rubber or resin. Preferably, the mole ratio of the radical initiator to the organic silane compound is adjusted to about 1:200 to about 1:1, especially about 1:100 to about 1:5. Thus, the suitable amount of the organic silane compound in the graft-modified rubber or resin ($b_1$) is about 0.5 to about 50%, preferably about 1 to about 30%, more preferably about 5 to about 25%, by weight based on the graft-modified rubber or resin ($b_1$). If the amount of the organic silane compound grafted is too small, the adhesion of the layer (B) to the layer (C) is reduced, and if the amount of the organic silane compound is too large, the adhesion of the layer (B) to the layer (A) tends to be reduced.

The radical initiator used in this invention is a compound capable of forming radical sites in the rubber or resin under the grafting reaction conditions, such as organic peroxides, organic peresters and azo compounds. Specific examples include organic peroxides and organic peresters, such as benzoyl peroxide, dichlorobenzoyl peroxide, dicumyl peroxide, di-tert-butyl peroxide, 2,5-dimethyl-2,5-di(peroxybenzoate)hexyne-3, 1,3-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate; and azo compounds such as azobisisobutyronitrile and dimethylazoisobutyrate. Preferred are dialkyl peroxides such as dicumyl peroxide, di-tert-butyl peroxide, 2,5-dimethyl-2,5-di(-tert-butylperoxy)hexyne-3, 2,5-dimethyl-2,5-di(tert-butylperoxy)hexane and 1,3-bis(tert-butylperoxyisopropyl)benzene.

The primer layer (B) may preferably contain up to 80% by weight, preferably up to 70% by weight, more preferably up to 60% by weight, of ($b_2$) an ultraviolet stabilizer (or absorber) in addition to the component ($b_1$).

The ultraviolet stabilizer may be any known stabilizers, such as salicylate esters, benzotriazoles, piperidines, and benzophenones. Specific examples of the ultraviolet stabilizer include salicylate esters such as phenyl salicylate, monoglycol salicylate and p-tert-butylphenyl salicylate; benzotriazole compounds such as 2(2'-hydroxy-5'-methylphenyl)-benzotriazole, 2(2'-hydroxy-3',5'-ditertbutylphenyl)benzotriazole, 2(2'-hydroxy-3'-tertbutyl-5'-methylphenyl)benzotriazole, 2(2'-hydroxy-3'-tertbutyl-5'-methylphenyl)-5-chlorobenzotriazole, 2(2'-hydroxy-3',5'-di-tertbutyl-phenyl)-5-chlorobenzotriazole and 2(2'-hydroxy-3',5'-dipentylphenyl)benzotriazole; resorcinol monobenzoate; 2'-ethylhexyl-2-cyano-3-phenyl cinnamate; piperidine compounds such as bis(2,2,6,6-tetramethyl-4-piperidine)sebacate and 4-benzoyloxy-2,2,6,6-tetramethylpiperidine; and benzophenone compounds such as 2-hydroxy-4-methoxy-4'-chlorobenzophenone, 2-hydroxy-4-methoxy-2'-carboxybenzophenone, 2-hydroxy-4-methoxy-4'-methylbenzophenone, 2,4-dihydroxybenzophenone, 2,2-dihydroxy-4,4'-dimethoxybenzophenone, 2,2',4,4'-tetrahydroxybenzophenone and 2-hydroxy-4-n-octoxybenzophenone. These ultraviolet stabilizers may be used singly or as a mixture of two or more.

Addition of such an ultraviolet stabilizer can be performed by any desired means, for example, direct addition of the ultraviolet stabilizer to the component (b$_1$) followed by mixing in the molten state, or addition of the ultraviolet stabilizer during or after the formation of a liquid-coating solution of the component (b$_1$) followed by mixing.

A nickel complex may be used as an auxiliary agent together with the ultraviolet stabilizer. Examples of the nickel complex are nickel biisooctyl phenyl sulfide, (2,2'-thiobis(4-tert-octyl phenolate))-n-butylamine nickel, and nickel dibutyl dithiocarbamate. The amount of the auxiliary agent is, for example, about 1 to about 30% by weight based on the weight of the ultraviolet stabilizer.

In the laminated structure of the invention, a cured layer (C) is liquid coated on and contacted with the layer (B). The layer (C) is derived from an uncured crosslinkable Si-containing compound selected from the group consisting of organo-alkoxysilanes, organo-acyloxysilanes and organopolysiloxanes. These crosslinkable Si-containing compounds for top coating are known and commercially available.

Examples of preferred crosslinkable Si-containing compounds are organo-alkoxy or -acyloxy silanes of the following formula

$$R_n^1 Si(OR^2)_{4-n} \quad (1)$$

wherein
R$^1$ is a member selected from the class consisting of alkyl groups having 1 to 20 carbon atoms, aryl groups having 6 to 8 carbon atoms, a vinyl group, aminoalkyl groups having 1 to 12 carbon atoms and epoxyalkyl groups having 1 to 15 carbon atoms, R$^2$ is a member selected from the group consisting of alkyl groups having 1 to 6 carbon atoms and alkylcarbonyl groups having 1 to 10 carbon atoms, and n is 0 or 1;
and organopolysiloxanes having the following formula

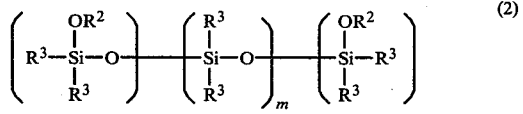

wherein
R$^2$ is as defined above, R$^3$ is a member selected from the class consisting of alkyl groups having 1 to 6 carbon atoms and hydroxyalkyl groups having 1 to 6 carbon atoms, and m is a number of from 0 to 4.

In the definition of R$^1$ in formula (1), examples of the alkyl groups are methyl, ethyl, propyl, butyl, pentyl, hexyl, octyl, decyl, tetradecyl and octadecyl groups; examples of the aryl groups are phenyl, benzyl and tolyl groups; examples of the aminoalkyl groups are aminomethyl, aminoethyl aminopropyl aminobutyl and aminopentyl groups; and an example of the epoxyalkyl groups is a γ-glycidoxy methyl, γ-glycidoxy ethyl, γ-glycidoxy propyl, γ-glycidoxy butyl and γ-glycidoxy pentyl group. In the definition of R$^2$, examples of the alkyl groups are the same as those given above with regard to R$^1$, and examples of the alkylcarbonyl groups are formyloxy, acetoxy and propionoxy groups.

As R$^2$ in formula (2), the same alkyl groups as illustrated above with regard to R$^2$ in formula (1), and hydroxyalkyl groups such as hydroxymethyl and hydroxyethyl can be exemplified.

Specific examples of the silanes of formula (1) include trialkoxysilanes such as methyltrimethoxysilane, ethyltrimethoxysilane, n-butyltrimethoxysilane, phenyltrimethoxysilane, methyltriethoxysilane, ethyltriethoxysilane, phenyltriethoxysilane, methyltripropoxysilane and methyltributoxysilane; tetraalkoxysilanes such as tetramethoxysilane, tetraethoxysilane, tetrapropoxysilane and tetrabutoxysilane; triacyloxysilanes such as methyltriacetoxysilane, ethyltriacetoxysilane, isopropyltriacetoxysilane, phenyltriacetoxysilane, vinyltriacetoxysilane, methyltripropionyloxysilane and ethyltripropionyloxysilane; vinyltrialkoxysilanes such as vinyltrimethoxysilane, vinyltriethoxysilane and vinyltributoxyaminoalkylalkoxysilanes such as aminomethyltriethoxysilane, N-β-aminoethylaminomethyltrimethoxysilane and γ-aminopropyltriethoxysilane; and epoxyalkylsilanes such as γ-glycidoxypropyltrimethoxysilane and γ-glycidoxypropylmethyldimethoxysilane.

Examples of the siloxanes of formula (2) include silicon-functional polysiloxanes such as 1,3-dimethoxytetramethyldisiloxane, 1,5-dimethoxyhexamethyltrisiloxane, 1,7-dimethoxyoctamethyltetrasiloxane, 1,9-dimethoxydecamethylpentasiloxane, 1,3-diethoxytetramethyldisiloxane, 1,5-diethoxyhexamethyltrisiloxane, 1,7-diethoxyoctamethyltetrasiloxane, 1,9-diethoxydecamethylpentasiloxane, 1,3-dimethoxyhexaethyltrisiloxane; and carbon-functional polysiloxanes such as 1,3-bis(hydroxymethyl)-1,1,3,3-tetramethyldisiloxane.

The laminated multilayer structure of this invention can be produced by liquid-coating the primer composition composed of (b$_1$) and (b$_2$) in the liquid state on the thermoplastic olefin resin layer (A) in the form of a shaped article, preferably a melt-shaped article, and liquid-coating the uncured crosslinkable Si-containing compound in the liquid state on the surface of the resulting primer layer (B), and curing the coated assembly under heat.

The layer (B) may be formed by dissolving the primer composition composed of (b$_1$) and (b$_2$) in a suitable organic solvent to form a solution or emulsion, applying the liquid primer composition to the layer (A) by such means as roll coating, brush coating, spray coating and dipping means, and removing the solvent by drying to form the layer (B) on the layer (A). This procedure utilizing an organic solvent is preferred because the coating primer composition can be adjusted to a proper concentration and it can be coated uniformly on the layer (A).

The organic solvent used to dissolve the primer composition in this procedure is preferably the one which can dissolve the primer composition and does not cause a loss of the transparency of the thermoplastic olefin resin constituting the layer (A). Examples of such a solvent are aromatic hydrocarbons such as benzene, toluene and xylene, aliphatic hydrocarbons such as n-hexane, cyclohexane and n-heptane, halogenated aliphatic hydrocarbons such as carbon tetrachloride, 1,1,1-trichloroethane, 1-chlorobutane and trichloroethylene, and halogenated aromatic hydrocarbons such as chlorobenzene, bromobenzene, iodobenzene and o-bromotoluene. The concentration of the solution or emulsion can be properly selected, and is, for example, about 1 to about 100 g per liter of solvent. The coating or dipping may be repeated several times.

In forming the cured layer (C), at least one of the uncured crosslinkable Si-containing compound may be directly applied to the layer (B) by the aforesaid coating or dipping means, and then cured. Preferably, the Si-containing compound is used as a solution in a suitable organic solvent in view of the surface finishing effect and the ease of the coating or dipping operation. The concentration of the solution is, preferably, for example, about 5 to about 50% by weight. Examples of the organic solvent used for this purpose are alcohols such as ethyl alcohol, propyl alcohol, butyl alcohol and amyl alcohol, ethers such as propyl ether, butyl ether, ethylene glycol monoethyl ether and ethylene glycol monomethyl ether, ketones such as methyl ethyl ketone and diethyl ketone, esters such as ethyl acetate, propyl acetate, butyl acetate and ethyl acetate, and aromatic hydrocarbons such as benzene, toluene and p-xylene. These solvents may be used singly or as a mixture of two or more.

Curing is carried out under heat. The heat treating (crosslinking) conditions can be properly selected according to the type of the thermoplastic olefin resin of the layer (A). Preferably, the treatment is carried out at a temperature of, for example, 60° to 150° C. Desirably, the heat-treating temperature does not exceed the softening temperature of the olefin resin, because the layer (A) in the form of a shaped article is likely to be deformed at a temperatures above the softening point. If required, the coating of the Si-containing compound may be repeated several times. Unless the coating or dipping is carried out after the Si-containing compound is partly or wholly cured, the Si-containing compound layer coated may be dissolved. Accordingly, the re-coating or dipping should be carried out at least after the layer previously applied has been cured to an extent of about 20%.

In order to accelerate curing, a crosslinking agent may be incorporated in the solution containing the crosslinkable Si-containing compound. Examples of the crosslinking agent are organic acids such as acetic acid, and organic metal salts such as calcium stearate, zinc stearate and dibutyltin dilaurate. The amount of the crosslinking agent is, for example, about 0.01 to about 0.1% by weight based on the weight of the crosslinkable Si-containing compound. In the curing operation, the crosslinking reaction may be caused to proceed completely by the heat-treatment. Or the crosslinking reaction is caused to proceed partly, for example to an extent of about 70 to about 90%, by the heat-treatment, and the rest of the curing reaction may be allowed to proceed under atmospheric conditions.

In the laminated multilayer structure of the invention, the thicknesses of the layers (B) and (C) may be properly chosen. Preferably, the thickness of the layer (B) is from about 0.01 to about 1 micron, and the thickness of the layer (C) is from about 0.1 to about 100 microns.

The laminated multilayer structure of the invention has light weight attributed to the thermoplastic olefin resin shaped article, and exhibits excellent delamination strength and excellent surface hardness, surface luster, transparency and weatherability. In an embodiment in which the layer (B) containing the ultraviolet stabilizer ($b_2$) is used, the weatherability of the laminated multilayer structure can be improved by using the stabilizer in a much smaller amount than that used when the stabilizer is incorporated into the thermoplastic olefin resin shaped article itself.

The laminated multilayer structure of the invention is useful in a wide range of indoor and outdoor applications, for example as windowpanes in automobiles and other vehicles, ships and buildings, covers for machines, windshield glasses, protective eyeglasses, goggles, sunglasses, shop displays, transparent toys and stationery, see-through panels, and optical lenses.

The following Examples and Comparative Examples illustrate the present invention more specifically.

The various tests performed in these examples were as follows:

(1) Adhesion:

Eleven lines were cut on the surface of the laminated plate at an interval of 1 mm both crosswise and lengthwise in a square of 10 mm$^2$. An adhesive Cellophane tape (Cellotape, a registered trademark, No. 250, a product of Nichiban Co., Ltd.) having a length of about 100 mm was applied to the cut surface. The applied Cellophane tape was rubbed by a glass rod having a diameter of 20 mm through ten reciprocations both lengthwise and crosswise, and the cellophane adhesive tape was peeled off from the end. The number of 1 mm$^2$ squares left was counted. The above test was performed three times, and the average number of squares left per 100 was determined.

(2) Light transmittance (haze): Measured by the method of ASTM D1003-61.

(3) Gloss: Measured by ASTM DS23-78

(4) Pencil hardness:

Measured by a Pencil Scratch Test based on JIS K5400-79 and JIS K5401-69

(5) Abrasion resistance:

A Taber abraser equipped with CS-10 Calibrase wheels and a 250 g load on each wheel was run for 100 cycles (ASTM D1044-78), and the haze was measured by ASTM D1003-61. The abrasion resistance was evaluated by the light transmission loss ($\Delta\%$) of the haze.

(6) Weathering test:

Performed in accordance with ASTM D1499-64 using Sunshine Carbon Arc Light as a light source.

(7) Tensile test: Measured by ASTM D638.

(8) Melt index: Measured in accordance with ASTM D1238-65T.

Production of polyolefin shaped articles

Each of the following polyolefin resins was molded by an injection molding machine (maximum injection volume of 7 ounces) to form a flat plate having a thickness of 2 mm.

(1) PHO-I

4-Methyl-1-pentene/1-hexadecene/1-octadecene terpolymer (1-hexadecene unit content 4.5% by weight; 1-octadecene unit content 4.5% by weight; melt index 70 g/10 min.).

(2) PHO-II

4-Methyl-1-pentene/1-hexadecene/1-octadecene terpolymer (1-hexadecene unit content 3.0% by weight; 1-octadecane unit content 3.0% by weight, melt index 70 g/10 min.).

(3) PHO-III

4-Methyl-1-pentene/1-decene copolymer (1-decene unit content 3.0% by weight; melt index 70 g/10 min.).

(4) PP

Polypropylene (melt index 11 g/10 min.).

Production of organic silane graft-modified polymers (1) VTMS-EPR-I

One hundred grams of an ethylene-propylene random copolymer (ethylene unit content 60 mole%; degree of crystallinity 0; melt index 30 g/10 min.: abbreviated "EPR" hereinafter) was put in a 300 ml glass reactor, and the inside of the reactor was purged with nitrogen. The polymer copolymer was then heated to 150° C. While stirring the molten EPR, a mixture of 30 g of vinyltrimethoxysilane (to be abbreviated "VTMS" hereinafter) and 1 g of 2,5-dimethyl-2,5-di(tert-butylperoxy)hexyne-3 was added over 2 hours, and the reaction was continued for another 2 hours. The reaction product was dissolved in p-xylene, and precipitated with a large excess of acetone. The solid was separated by filtration, and dried. The product was a vinyltrimethoxysilane grafted ethylene-propylene random copolymer (to be abbreviated "VTMS-EPR-I" hereinafter) having a VTMS content of 9.9% by weight and a melt index of 15 g/10 min.

By a similar method, graft-modified polymers having varying amounts of VTMS grafted to EPR were produced.

(2) In the same way as in the preparation of VTMS-EPR-I, graft-modified polymers having vinyltriethoxysilane (VTES), vinyltributoxysilane (VTBS) and $\gamma$-methacryloxypropyltrimethoxysilane ($\gamma$-MMS) used instead of VTMS grafted to EPR were produced.

(3) EBE graft-modified with VTMS was produced in the same way as in the preparation of VTMS-EPR-I using an ethylene/1-butene/ethylidenenorbornene terpolymer (ethylene unit content 92 mole%; iodine value 15; degree of crystallinity 20; melt index 540 g/10 min.: to be abbreviated "EBE") instead of EPR.

(4) A 1500 ml pressure-resistant glass reactor was charged with 50 g of 4-methyl-1-pentene/1-decene copolymer (1-decene unit content 3.0% by weight; melt index 20 g/10 min.: to be abbreviated "P4MP" hereinafter) and 450 ml of toluene. After purging the inside of the reactor with nitrogen, the contents were heated to 145° C. While the resulting solution was being stirred at 300 rpm, a mixture consisting of 148 g of VTMS, 43.8 g of di-tert-butyl peroxide and 50 ml of toluene was added over 4 hours. The reaction was carried out further for 2 hours. The reaction product was precipitated with a large excess of acetone. The precipitate was separated by filtration, and dried. The amount of VTMS grafted in this reaction product was 13.8% by weight.

EXAMPLE 1

One gram of VTMS-EPR-I was dissolved in 100 ml of toluene, and the flat plate of PHO-I was dipped for 10 seconds in 100 ml of toluene and dried to form a film having a thickness of about 0.1 micron.

Then, the above flat plate was dipped for 10 seconds in a solution of a composition consisting mainly of methyltrimethoxysilane in a mixture of isopropyl alcohol and acetone (#X-12-940; a product of Shinetsu Chemical Co., Ltd.) and dried in the air and then heated in an oven at 80° C. for 50 minutes to form a surface-cured layer having a thickness of about 5 microns.

The resulting laminated plate was subjected to various tests, and the results are shown in Table 1.

EXAMPLES 2 AND 3

Example 1 was repeated except that EPR copolymers having 4.9 g and 16.1% by weight respectively of VTMS grafted thereto were used.

EXAMPLES 4 AND 5

The toluene solution of VTMS-EPR-I used in Example 1 was changed to a p-xylene or benzene solution of VTMS-EPR-I. Otherwise, the procedure of Example 1 was repeated.

EXAMPLES 6 TO 8

Example 1 was repeated except that VTES, VTBS and $\gamma$-MMS were respectively used instead of VTMS in Example 1, and the amounts of these monomers grafted were adjusted.

EXAMPLES 9 AND 10

Example 1 was repeated except that EBE and P4MP were used instead of EPR in Example 1, and the amounts of these monomers grafted were adjusted.

EXAMPLE 11

Example 1 was repeated except that an isopropyl alcohol solution of a silane obtained by partial hydrolysis of an equimolar mixture of $\gamma$-glycidoxypropyltrimethoxysilane and $\gamma$-aminopropyltriethoxysilane was used instead of the methyltrimethoxysilane solution for forming a top coat layer used in Example 1, and the heating was done at 100° C. for 60 minutes.

COMPARATIVE EXAMPLE 1

The PHO-I flat plate itself was tested without applying VTMS-EPR-I solution as a primer coat solution and methyltrimethoxysilane solution as a top coat solution. The results are shown in Table 1.

COMPARATIVE EXAMPLE 2

Only the methyltrimethoxysilane solution was applied to PHO-I in the same manner as in Example 1 without applying the VTMS-EPR-I solution.

COMPARATIVE EXAMPLE 3

Example 1 was repeated except that a hydrolyzed product of vinyltrimethoxysilane was used instead of the VTMS-EPR-I.

COMPARATIVE EXAMPLE 4

A 0.3 micron film as a primer layer was formed by using a 20% by weight butanol solution of the reaction product of $\gamma$-aminopropyltriethoxysilane and maleic anhydride (to be abbreviated "APTE/MAN" hereinafter) used instead of the VTMS-EPR-I in Example 1, and then in the same way as in Example 1, a cured coating of methyltrimethoxysilane was formed as a top coat layer.

In Comparative Examples 2 to 4, the surface silicone coating was easily peeled off, and therefore, the pencil hardness and abrasion resistance of the resulting products were the same as those of the substrate PHO-I (Comparative Example 1).

TABLE 1

| | | Primer composition | | | Results of evaluation | | | | |
|---|---|---|---|---|---|---|---|---|---|
| | Substrate | Rubber | Organic Si compound | Amount grafted (wt. %) | Solvent | Adhesion (number) | Light transmittance (%) | Degree of gloss | Pencil hardness | Abrasion resistance (Δ%) |
| Example 1 | PHO-I | EPR | VTMS | 9.9 | Toluene | 100 | 94 | 175 | HB | 8 |
| Example 2 | " | " | " | 4.9 | " | 100 | 94 | 174 | B | 8 |
| Example 3 | " | " | " | 16.1 | " | 100 | 94 | 176 | HB | 7 |
| Example 4 | " | " | " | 9.9 | p-Xylene | 80 | 94 | 178 | B | 10 |
| Example 5 | " | " | " | 9.9 | Benzene | 100 | 94 | 175 | HB | 7 |
| Example 6 | " | " | VTES | 6.9 | Toluene | 100 | 94 | 173 | HB | 9 |
| Example 7 | " | " | VTBS | 10.7 | " | 70 | 94 | 177 | B | 12 |
| Example 8 | " | " | γ-MMS | 8.9 | " | 100 | 94 | 174 | HB | 14 |
| Example 9 | " | EBE | VTMS | 6.7 | " | 70 | 94 | 176 | HB | 10 |
| Example 10 | " | P4MP | " | 13.8 | 1,1,1-trichloroethane | 100 | 94 | 176 | F | 1 |
| Example 11 | " | EPR | " | 9.9 | Toluene | 100 | 93 | 168 | B | 23 |
| Comparative Example 1 | " | — | — | — | — | — | 93 | 169 | 3B | 41 |
| Comparative Example 2 | " | — | — | — | — | 0 | 93 | 169 | 3B | 41 |
| Comparative Example 3 | " | — | Hydrolyzed VTMS | — | Ethanol | 0 | 93 | 169 | 3B | 41 |
| Comparative Example 4 | " | — | γ-APTE/ MAH | — | Butanol | 0 | 93 | 169 | 3B | 41 |

EXAMPLES 12 TO 14

In the same way as in Examples 1, 4 and 5, the VTMS-EPR-I solution and the methyltrimethoxysilane solution were coated on the PHO-II flat plate. The laminated plates were tested, and the results are shown in Table 2.

COMPARATIVE EXAMPLE 5

The PHO-II flat plate itself was tested without applying the VTMS-EPR-I solution and the methyltrimethoxysilane solution. The results are shown in Table 2.

EXAMPLE 15

The PP flat plate was coated with the VTMS-EPR-I solution and the methyltrimethoxysilane solution in the same way as in Example 1, and the resulting laminate was tested. The results are shown in Table 2.

COMPARATIVE EXAMPLE 6

The PP flat plate itself was tested, and the results are shown in Table 2.

TABLE 2

| | | Primer composition | | | | Results of evaluation | | | |
|---|---|---|---|---|---|---|---|---|---|
| | Substrate | Rubber | Organic Si compound | Amount grafted (wt. %) | Solvent | Adhesion | Light transmittance (%) | Degree of gloss | Pencil hardness | Abrasion resistance (Δ%) |
| Example 12 | PHO-II | EPR | VTMS | 9.9 | Toluene | 100 | 94 | 176 | H | 9 |
| Example 13 | " | " | " | " | p-Xylene | 100 | 94 | 178 | H | 12 |
| Example 14 | " | " | " | " | Benzene | 100 | 94 | 175 | H | 8 |
| Comparative Example 5 | " | — | — | — | — | — | 93 | 171 | 2B | 36 |
| Example 15 | PP | EPR | VTMS | 9.9 | Toluene | 95 | 86 | 102 | 2H | 11 |
| Comparative Example 6 | " | — | — | — | — | — | 84 | 84 | HB | 19 |

EXAMPLES 16 TO 18 AND COMPARATIVE EXAMPLE 7

Each of the laminates obtained in Examples 5, 6 and 9 and the plate of Comparative Example 1 was subjected to a hot water treatment (dipped for 17 hours in warm water at 80° C.) and heat-treatment (allowed to stand for 30 minutes in an oven at 160° C.). The treated plates were tested, and the results are shown in Table 3.

TABLE 3

| | Hot water treatment (80° C. × 17 hrs.) | | | | | Heat treatment (160° C. × 30 min.) | | | | |
|---|---|---|---|---|---|---|---|---|---|---|
| | Adhesion (number) | Light transmittance (%) | Degree of gloss | Pencil hardness | Abrasion resistance (Δ%) | Adhesion | Light transmittance (%) | Degree of gloss | Pencil hardness | Abrasion resistance (Δ%) |
| Example 16 | 100 | 94 | 168 | HB | 8 | 100 | 94 | 171 | H | 9 |
| Example 17 | 100 | 93 | 170 | HB | 9 | 100 | 94 | 170 | H | 9 |
| Example 18 | 70 | 94 | 171 | B | 12 | 60 | 95 | 172 | B | 9 |
| Comparative Example 7 | — | 93 | 160 | 3B | 41 | — | 93 | 164 | 3B | 40 |

EXAMPLES 19 TO 26

One gram of a vinyltrimethoxysilane graft-modified ethylene/propylene random copolymer rubber (the amount of VTMS grafted 24.2% by weight; melt index 8 g/10 min.: to be abbreviated "VTMS-EPR-II" hereinafter) was dissolved in 100 ml of 1,1,1-trichloroethane. The PHO-III flat plate was dipped for 10 seconds in the resulting solution, and dried to form a film of VTMS-EPR-II having a thickness of about 0.1 micron on the PHO-III flat plate. Then, the flat plate was dipped for 10 seconds in the isopropyl alcohol-acetone solution containing methyltrimethoxysilane as a main ingredient (#X-12-917, a product of Shinetsu Chemical Co., Ltd.) and dried at room temperature. When the curing reaction of the methyltrimethoxysilane proceeded to some extent (about 20%), the plate was again dipped for 10 seconds in the methyltrimethoxysilane solution. This operation was repeated the number of times shown in Table 4 to increase the thickness of the surface coating successively. Finally, the coated product was heated in an oven at 80° C. for 50 minutes to cure its surface completely. The resulting laminated plate was tested, and the results are shown in Table 4.

COMPARATIVE EXAMPLE 8

The PHO-III flat plate was tested without applying the VTMS-EPR-II solution and the methyltrimethoxysilane solution. The results are shown in Table 4.

EXAMPLE 35

One gram of vinyltrimethoxysilane graft-modified ethylene/propylene random copolymer (the amount of VTMS grafted 17.9% by weight; melt index 8 g/10 min.: to be abbreviated "VTMS-EPR-III" hereinafter) and 1 g of 2-(2'-hydroxy-3'-tert-butyl-5'-methyl-phenyl)-5-chlorobenzotriazole (TINUVIN #326, a product of Ciba-Geigy AG) were dissolved in 100 ml of 1,1,1-trichloroethane and blended. The PHO-III flat plate was dipped for 30 seconds in the solution, and dried to form a film having a thickness of 0.1 micron. Then, the above plate was dipped for 10 seconds in an isopropyl alcohol-methyl alcohol mixed solution of methyltrimethoxysilane (#X-12-940, a product of Shinetsu Chemical Co., Ltd.), dried and then heated in an oven at 80° C. for 120 minutes to form a surface-cured coating having a thickness of 3 to 5 microns.

The content of the 2-(2'-hydroxy-3'-tert-butyl-5'-methyl-phenyl)-5-chlorobenzotriazole in the laminate corresponded to about 0.01 g per 100 g of the PHO-III.

The laminate was tested, and the results are shown in Table 6.

EXAMPLE 36

Example 35 was repeated except that a solution obtained by dissolving 1 g of VTMS-EPR-III, 1 g of 2-(2'-hydroxy-3'-tert-butyl-5'-methyl-phenyl)-5-chlorobenzotriazole (TINUVIN #326, a product of Ciba-Geigy

TABLE 4

| | | | Results of evaluation | | | | |
|---|---|---|---|---|---|---|---|
| | Substrate | Number of dippings in the solution of the silane compound | Thickness of the top coating layer (μ) | Adhesion (number) | Light transmittance (%) | Degree of gloss | Pencil hardness | Abrasion resistance (Δ%) |
| Comparative Example 8 | PHO-III | — | 0 | — | 93 | 173 | 2B | 47 |
| Example 19 | " | 1 | –5 | 100 | 94 | 188 | F | 4 |
| Example 20 | " | 2 | 7–9 | " | 94 | 180 | H | 4 |
| Example 21 | " | 3 | 11–13 | " | 94 | 185 | 2H | 4 |
| Example 22 | " | 4 | 14–17 | " | 94 | 184 | 2H | 4 |
| Example 23 | " | 5 | 17–22 | " | 94 | 184 | 2H | 4 |
| Example 24 | " | 6 | 20–26 | " | 94 | 190 | 3H | 3 |
| Example 25 | " | 7 | 24–31 | " | 94 | 185 | 4H | 4 |
| Example 26 | " | 8 | 27–36 | " | 94 | 190 | 4H | 4 |

EXAMPLES 27 to 34 and Comparative Example 9

The flat plates in Examples 19 to 26 and Comparative Example 8 were subjected to the hot water treatment and heat-treatment described in Example 16, and then tested. The results are shown in Table 5.

AG) and 0.1 g of bis(2,2,6,6-tetramethyl-4-pyperizine)-sebacate (SANOL #LS-770, a product of Sankyo Co., Ltd.) was used instead of the primer solution of Example 35. The laminated plate was tested, and the results are shown in Table 6.

TABLE 5

| | Hot water treatment (80° C. × 17 hrs.) | | | | | Heat treatment (160° C. × 30 min.) | | | | |
|---|---|---|---|---|---|---|---|---|---|---|
| | Adhesion (number) | Light transmittance (%) | Degree of gloss | Pencil hardness | Abrasion resistance (Δ%) | Adhesion (number) | Light transmittance (%) | Degree of gloss | Pencil hardness | Abrasion resistance (Δ%) |
| Example 27 | 100 | 94 | 175 | F | 4 | 100 | 94 | 182 | F | 4 |
| Example 28 | " | 94 | 172 | H | 4 | " | 94 | 175 | 2H | 4 |
| Example 29 | " | 94 | 179 | 2H | 4 | " | 94 | 190 | 2H | 4 |
| Example 30 | " | 94 | 180 | 2H | 4 | " | 94 | 191 | 2H | 4 |
| Example 31 | " | 94 | 175 | 2H | 3 | " | 94 | 185 | 3H | 4 |
| Example 32 | " | 94 | 181 | 3H | 4 | " | 94 | 188 | 3H | 4 |
| Example 33 | " | 94 | 173 | 4H | 4 | " | 94 | 176 | 4H | 4 |
| Example 34 | " | 94 | 188 | 4H | 4 | " | 94 | 174 | 4H | 4 |
| Comparative Example 9 | — | 93 | 165 | 2B | 49 | — | 93 | 170 | 2B | 47 |

Comparative Example 10

The PHO-III flat plate was tested without applying the VTMS-EPR-III solution and the methyltrimethoxysilane solution. The results are shown in Table 6.

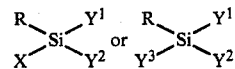

TABLE 6

|  | Adhesion | Haze (%) | Appearance | Pencil hardness | Abrasion resistance (Δ%) | Tensile test Tensile modulus (kg/cm$^2$) | Tensile strength at break (kg/cm$^2$) | Elongation at break (%) |
| --- | --- | --- | --- | --- | --- | --- | --- | --- |
| Weatherability evaluation time (0 hr.) | | | | | | | | |
| Example 35 | 100 | 94 | Good | HB | 1 | 260 | 190 | 32 |
| Example 36 | 100 | 94 | " | HB | 1 | 260 | 190 | 34 |
| Comparative Example 10 | — | 93 | " | 2B | 74 | 240 | 170 | 33 |
| Weatherability evaluation time (400 hrs.) | | | | | | | | |
| Example 35 | 100 | 92 | Good | H | 1 | 240 | 180 | 26 |
| Example 36 | 100 | 92 | " | H | 1 | 240 | 180 | 29 |
| Comparative Example 10 | — | 91 | Cracks occurred | 6B | 88 | Not measurable | 0 | 0 |

EXAMPLE 37

A laminated plate was produced by repeating the procedure of Example 35 except that the ultraviolet absorber was not used. The laminated plate was subjected to the following tests, and its adhesion, haze, pencil hardness, mar resistance (ASTM D673-70 using 800 g of a silicon carbide abrasive; expressed in %), and appearance of the laminated plate were measured, and the results are shown in Table 7.

(1) Heat stability test (in an air oven at 80° C. for 10 days)
(2) Hot water resistance test (in warm water at 80° C. for 10 days)
(3) Ethanol resistance test (dipped in ethanol at room temperature for 30 days)
(4) Heat cycle test (in an air oven at 80° C. for 20 minutes, in a refrigerator at −20° C. for 20 minutes; this cycle was repeated twenty times)
(5) Weatherability test (for 400 hours in a sunshine weatherometer)

TABLE 7

|  | Adhesion | Haze | Pencil hardness | Mar resistance | Appearance |
| --- | --- | --- | --- | --- | --- |
| Initial | 100 | 94 | HB | 4 | Good |
| After the heat stability test | 100 | 94 | F | 11 | Good |
| After the hot water test | 100 | 93 | F | 20 | Good |
| After the ethanol test | 100 | 93 | B | 12 | Good |
| After the heat cycle test | 100 | 94 | HB | 4 | Good |
| After the weathering test | 100 (from 100 hrs. till 200 hrs.) 0 (after 300 hrs.) | 93 | B | 14 | Cracks occurred at the end of 320 hours. |

What we claim is:

1. A laminated multilayer structure comprising
   (1) a thermoplastic olefin resin layer (A) in the form of a shaped article,
   (2) a primer layer (B) liquid-coated on and contacted with at least one surface of the layer (A) and composed of
   ($b_1$) 20 to 100% by weight based on the weight of the layer (B) of a graft-modified synthetic olefinic rubber or graft-modified 4-methyl-1-pentene resin obtained by grafting an organic silane compound having the following formula wherein R represents a monovalent olefinically unsaturated hydrocarbon radical having up to 20 carbon atoms or a monovalent olefinically unsaturated hydrocarbonoxy radical having up to 11 carbon atoms, X represents a monovalent hydrocarbon radical selected from the class consisting of alkyl groups having 1 to 20 carbon atoms and aryl groups having 6 to 8 carbon atoms, and $Y^1$, $Y^2$ and $Y^3$ are identical or different and each represents a functional member selected from the class consisting of alkoxy groups having 1 to 6 carbon atoms, alkylcarbonyl groups having 1 to 10 carbon atoms, oxime groups having 3 to 15 carbon atoms and substituted amino groups having a substituent selected from lower alkyl groups and a phenyl group, and ($b_2$) 0 to 80% by weight based on the weight of the layer (B) of an ultraviolet stabilizer, and
   (3) a cured layer (C) liquid-coated on and contacted with the layer (B) and derived from an uncured crosslinkable Si-containing compound selected from the group consisting of organo-alkoxysilanes, organo-acyloxysilanes and organo-polysiloxanes.

2. The laminated multilayer structure of claim 1 wherein the thermoplastic olefin resin of layer (A) is a polymer or copolymer of an olefin selected from the group consisting of propylene and 4-methyl-1-pentene.

3. The laminated multilayer structure according to claim 1 wherein the amount of the graft-modified rubber or resin ($b_1$) is 30 to 96% by weight and the amount of the ultraviolet stabilizer ($b_2$) is 4 to 70% by weight.

4. The laminated multilayer structure of claim 1 wherein the amount of the organic silane compound in the graft-modified rubber or resin ($b_1$) is about 0.5 to about 50% by weight based on the graft-modified rubber or resin ($b_1$).

5. The laminated multilayer structure of claim 1 wherein the organic silane compound in the graft-modified rubber or resin ($b_1$) has the following formula

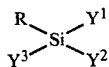

wherein R represents a vinyl or allyl group, and $Y^1$, $Y^2$ and $Y^3$ are the same and represent an alkoxy group having 1 to 6 carbon atoms.

6. The laminated multilayer structure of claim 1 wherein the synthetic olefinic rubber is selected from the group consisting of an ethylene/$C_3$-$C_8$ α-olefin random copolymer rubber, an ethylene/$C_3$-$C_8$ αolefin/diene random copolymer rubber, a propylene/$C_4$-$C_8$ α-olefin random copolymer rubber and a propylene/$C_4$-$C_8$ α-olefin/diene random copolymer rubber.

7. The laminated multilayer structure of claim 1 wherein the crosslinkable Si-containing compound of the layer (C) is an organo-alkoxy or -acyloxy silane having the following formula $$R^1{}_n Si(OR^2)_{4-n}$$

wherein
 $R^1$ is a member selected from the class consisting of alkyl groups having 1 to 20 carbon atoms, aryl groups having 6 to 8 carbon atoms, a vinyl group, aminoalkyl groups having 1 to 12 carbon atoms and epoxyalkyl groups having 1 to 15 carbon atoms, $R^2$ is a member selected from the class consisting of alkyl groups having 1 to 6 carbon atoms and alkylcarbonyl groups having 1 to 10 carbon atoms, and n is 0 or 1;
or an organopolysiloxane having the following formula

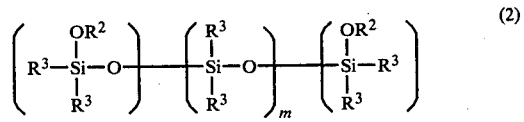

wherein
 $R^2$ is as defined above, $R^3$ is a member selected from the class consisting of alkyl groups having 1 to 6 carbon atoms and hydroxyalkyl groups having 1 to 6 carbon atoms, and m is a number of from 0 to 4.

8. The laminated multilayer structure of claim 1 wherein the thickness of the layer (B) is from about 0.01 to about 1 micron and the thickness of the layer (C) is from about 0.1 to about 100 microns.